Aug. 5, 1924.

A. FAES 1,503,645

PHOTOGRAPHIC ROLL FILM

Filed Feb. 4, 1922

Inventor
Armand Faes
by H.B. Wilson Yeo
Attorneys

Patented Aug. 5, 1924.

1,503,645

UNITED STATES PATENT OFFICE.

ARMAND FAES, OF MORTSEL, NEAR ANTWERP, BELGIUM, ASSIGNOR TO GEVAERT PHOTO PRODUCTEN N. V., OF VIEUX-DIEU NEAR ANTWERP, BELGIUM.

PHOTOGRAPHIC ROLL FILM.

Application filed February 4, 1922. Serial No. 534,164.

*To all whom it may concern:*

Be it known that I, ARMAND FAES, a subject of the King of Belgium, and resident of Mortsel, near Antwerp, Belgium, have invented certain new and useful Improvements in Photographic Roll Films; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

Photographic roll films are usually wound on a spool or spindle together with one or several strips of opaque paper, serving as a protection against the light. These strips are at both ends a little longer than the film, so as to enable one to place the cartridge in the camera without the aid of a dark room.

When the spool or cartridge is being placed in the photographic apparatus, the forward or outer end of the film is connected to the protecting paper by means of a gummed label or by any other means, but the rear or inner end, i. e. the end which is last to be exposed must remain free, so as to constitute no hindrance to the unwinding and rewinding of the film inside the apparatus, especially since the protecting strip is always longer than the film.

After each exposure, the film is gradually unwound from the original spool upon another, so that when the cartridge is taken out of the camera, the film is found to be rolled in the opposite direction, so that the inner end has now become the outer one. When the film is to be developed by means of one of the various special apparatuses which have been devised for developing roll films without dark room, the film is to be rolled on the spool placed inside said apparatuses, and in order that the film may advance at the same time as the protecting strip, it was hitherto necessary to attach the rear end of the film to the covering paper, by means of a gummed label, and despite all precaution, there is always some risk of exposing some portion of the film to the light.

The present invention has for its object to make that attachment unnecessary, and provides a means of securing the end of the film to the covering strip, in such a way that the protecting paper and the film may slide the one over the other.

Other inventors have endeavoured to solve the problem but it has been impossible to carry out any of their systems in practice as they were unsuitable for current manufacture and they contained other defects which rendered them useless.

Thus in certain arrangements the attachment of the film to the protecting paper was effected by one or more tongues or flaps at the end of the film and transversing the protecting paper. Such arrangements have the disadvantage that the part of the flap which transverses the protecting paper comes into direct contact with the sensitized surface of the film when the latter is rolled up, so that very often friction marks, fogging, etc., may result, and portions of the film thus become useless.

Another serious disadvantage of the system in question is that they require a slot in the strip of protecting paper, either in the longitudinal direction or in that of the breadth whereby the protecting band is considerably weakened especially in the smaller sizes. On the other hand the crossing of the film end and of the protecting paper passing through the slot, causes differences in thickness which is damaging to the film.

For the purpose of obviating these disadvantages the present invention provides a roll film in which the film is connected to the protecting paper so as to enable the same to move along the latter, without the aid of a slot in the protecting band.

This result is obtained by forming a flap or tongue at the end of the film and retaining this flap in position by means of a sheet of paper which itself is connected to the band of protecting paper. This sheet of paper may, for instance consist of a strip gummed near its two edges thus leaving between the latter a space in which the flap formed at the end of the sensitized film may slide. Said flap or tongue may be formed by cutting one end of the film to the required shape.

The accompanying drawings show by way of example various forms of construction according to the invention.

In the drawings:—

In these drawings the same elements are indicated by the same reference numerals.

Figure 1:
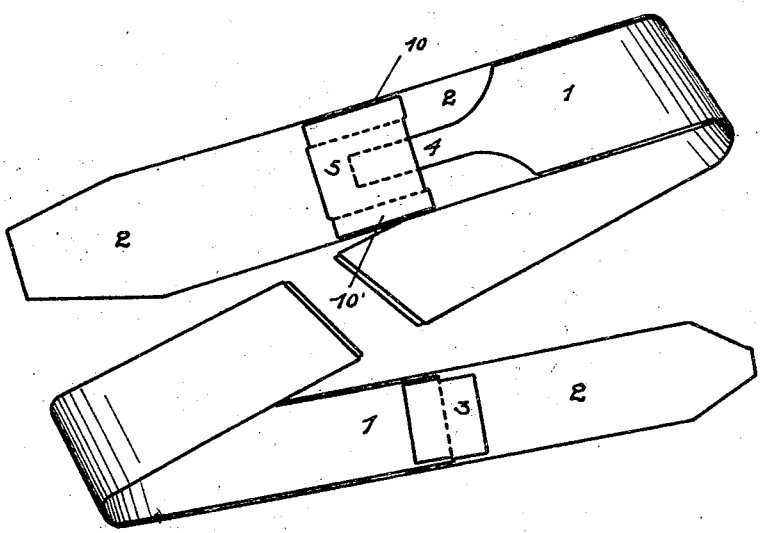
Fig. 1 shows one form of construction according to the invention.

The sensitized film 1 is rolled at the same time as a band of protecting paper 2 on a roller 9.

At one of their ends (Fig. 1) the film 1 and band 2 are strongly connected together by a gummed label 3. At their other ends the film 1 and the band 2 are connected together in such a way that one may move one relatively to the other.

According to the invention, this slidable connection is effected by means of a sheet of paper 5 of very nearly of the same width as the band 2, and a flap 4 formed at the end of the film 1.

In the construction shown in Fig. 1 this sheet of paper 5 is previously gummed along its two edges 10, 10' in the direction of the length of the protecting band, and glued to the band by means of these gummed portions, so that between said edges a space is formed through which the flap 4 may slide.

Figure 2:
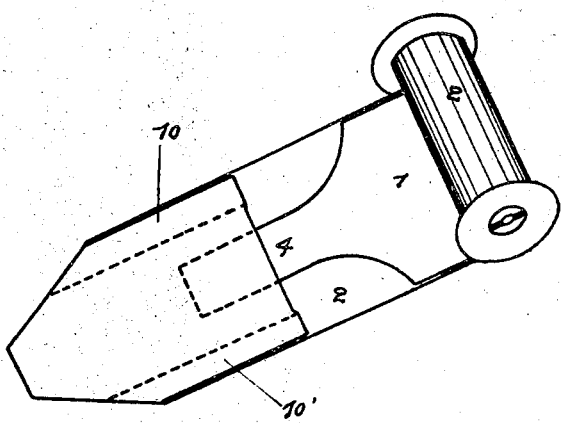
Fig. 2 shows a second form of construction.

In the construction shown in Fig. 2 the sheet of paper 5 for holding flap 4 is formed by having the end of the band of protecting paper 2 folded upon itself on the inner side of the said band.

This folded portion is gummed along its two edges 10 and 10' so as to obtain a similar arrangement to that shown in Fig. 1.

Claims:

1. A photographic roll film in which the sensitized film is rolled on a spool at the same time as a band of protecting paper, the end of both the sensitized film and the protecting band being connected together in such a way that the protecting band and sensitized film may slide the one over the other, by providing a flap or tongue at the end of the sensitized film and slidably retaining this flap in position by means of a pocket forming element having its side edge portions connected to the side edge portions of the band of protecting paper.

2. A photographic roll film in which the sensitized film is rolled on a spool at the same time as a band of protecting paper, the end of both the sensitized film and the protecting band being connected together in such a way that the protecting band and sensitized film may slide the one over the other by providing a flap or tongue at the end of the sensitized film and retaining said flap or tongue in position by means of the end of the band of protecting paper being folded upon itself on the inner side of the said band.

In testimony whereof I affix my signature in presence of two witnesses.

ARMAND FAES.

Witnesses:
JOSYL VLIETINCK,
LUCIEN J. DE BLOCHEUX.